Original Patent Dated August 1, 1865

REISSUED JAN 31 1871

Joseph H. Fisher: Improvement in Refrigerators.

4242

Inventor:
Joseph H. Fisher,
by Bakewell & Hosly,
his Attys.

Witnesses.
R. C. Orenshall
Thos B. Kerr

UNITED STATES PATENT OFFICE.

JOSEPH HYDE FISHER, OF CHICAGO, ILLINOIS.

IMPROVEMENT IN REFRIGERATORS.

Specification forming part of Letters Patent No. 49,098, dated August 1, 1865; Reissue No. 4,242, dated January 31, 1871.

*To all whom it may concern:*

Be it known that I, JOSEPH HYDE FISHER, of Chicago, in the county of Cook and State of Illinois, have invented a new and useful Improvement in Refrigerators or Houses for Preserving Animal and Vegetable Substances; and I do hereby declare the following to be a full, clear, and exact description thereof, reference being had to the accompanying drawings, forming part of this specification, in which—

Figure 2:
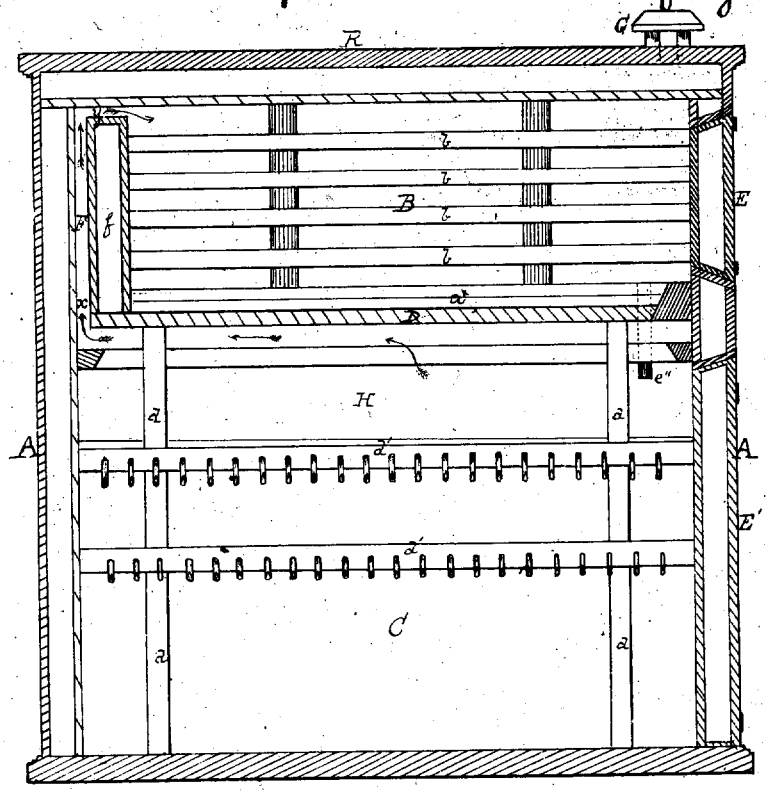
Figure 1:
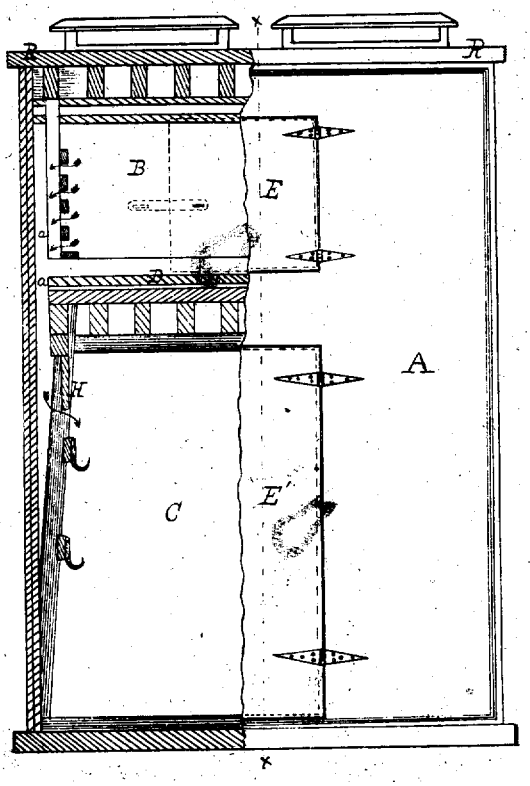

Figure 1 is an end elevation of a cooling-house constructed in accordance with my improvement, shown partly in section. Fig 2 is a longitudinal vertical section thereof through the line *x x* of Fig. 1.

Like letters of reference indicate similar parts.

My invention relates to receptacles for preserving animal and vegetable substances by exposing them therein to a cool, dry atmosphere, and is equally applicable for use on a large scale in packing-houses, breweries, hotels, steamboats, railroad-cars, &c., as on a small scale in refrigerators for family use.

In my improved cooling-house or receptacle, the cool dry atmosphere is produced by means of ice; and my invention consists not only in so constructing the ice-chamber and preserving-chamber as that the air warmed entering from outside will rise into and the by contact with the meat, vegetables, &c., on cooled air descend from the ice-chamber by separate flues or passages, so as not to come in contact with each other in such passage, but also that the cooled air from the ice-chamber shall enter the preserving-chamber so near to the top as to leave sufficient space below the highest point of entrance of the cool air for the storing of the meat, vegetables, &c., to be preserved, while the comparative shallow space above that point, being shielded from the entering stream of cool air, receives the stratum of warmer air, gases, &c., which pass up out of the reach of the cool air to the upper part of the ice-chamber, to be there cooled, and thence returned to the preserving-chamber, while any lighter gases evolved may escape through a suitable ventilator above the ice-chamber.

The peculiar effect produced by my improvement is that the warm, moist air, and the vapors from the contents of the preserving-chamber, rise to the top of the preserving-chamber and form a warmer stratum above the level of the point at which the cool air enters and above the meat, vegetables, or other articles to be preserved; whereas if the cool air were allowed to enter at or near the bottom of the preserving-receptacle, the moisture would be condensed within the preserving-chamber before it could rise to the top and escape into the ice-chamber, and thus the atmosphere of the preserving-chamber, although cooled, would not be rendered dry. By my improvement, a strong drying effect is produced, as well as a greater reduction of temperature, than by means of other known constructions of refrigeratory apparatus.

I will proceed to describe the construction of a preserving-house embodying my improvement.

The exterior walls A and roof R of the house are constructed double and filled in between with any good non-conductor of heat, such as tanbark, rice-chaff, charcoal, &c. The house is divided into two compartments or chambers, B C, by a flooring, D, which is slightly inclined from a horizontal position, preferably toward the front of the house, where the doors are situate. This inclination is to facilitate the escape of the waste water from the melting ice. The flooring is supported on joists supported by the walls of the house, but it does not extend quite to the inner walls of the house at one end and at one or both sides, thereby leaving a passage (at *x*, Fig. 2) at one or both ends for the ascent of the warm air, and at one or both sides (at *a*, Fig. 1) for the descent of the cool air. The floor D may be double, as shown in the drawings, Figs. 1, and has a filling or lining of pitch, gutta-percha, or other water-proof and non-conducting substance, to prevent the percolation of the water from the ice-chamber into the preserving-chamber C below. A spout, $c''$, at the lowest point in the floor carries off the waste water from the ice. On the floor D of the ice-chamber, at the edge on each side, is a strip, $a^{\times}$, high enough to prevent any overflow of waste water into the side flues, *a*. Above these strips $a^{\times}$ rises an open frame-work of slats, *b b b*, on each side, which serves as a guard or fender to keep the blocks of ice in place and prevent their coming in contact with the side walls A and obstructing the cold-air passages *a*, which afford communication between the two chambers B and C. At the rear end of the floor D is a vertical partition, *f*, (made double, like the sides A of the house, as shown in Fig. 2, and similarly filled,) which partition extends from one side of the room to the other, at a suitable distance from the end wall A to leave a flue or passage, F, for the ascent of the warm air, and extends upward to within a short distance of the top or roof of the house, leaving a passage at *y* from the flue F to the ice-chamber. (See Fig. 2.) The lower end of this flue F communicates with the chamber *c* at the under side of the floor D, as clearly shown in Fig. 2. At the end of the house farthest from the vertical flue F is a small opening or ventilator, G, to allow of the escape of any light gas or effluvium from the contents of the preserving-chamber.

On each side of the lower chamber, C, at the edge of the floor D, below the cold-air passage *a* and below the flooring joists, is an apron, H, which hangs down a distance of from six to eighteen inches, depending on the size and capacity of the preserving-chamber, and extending the whole length thereof. The object of such apron is to prevent the cold air from entering the lower or preserving chamber, C, at top, immediately under the floor D, and to form a shield to prevent the stratum of warm air which exists above the lower edge of the aprons from passing into the flues *a* on each side of the floor and ice-chamber. There is no such apron at the end of the floor D where the flue F opens into the lower chamber, C, and as that point (the mouth of flue F) is more elevated than the under side of the apron H, the warm air finds its exit upward through the flue F, and does not pass below or under the apron H into the descending cold-air passage *a*.

The preserving-chamber C has post *d* and cross-bars *d'* furnished with hooks to hang meat, &c., upon, these bars and hooks being all placed below the under side of the aprons H, and therefore below the stratum of heated air.

There is no opening to the external air excepting the small one at the ventilators G and the door E, for filling the ice-compartment, and the lower door, E', for introducing and taking out the meat, &c. These doors are kept closed as much as possible. The ventilators G are useful to allow the compartments to be ventilated by opening the doors when not in use, and for the escape of gas and effluvium, but may be dispensed with, if desired, as when the apparatus is in use and the doors closed there is no other opening for the admission of external air.

The operation of my improved cooling and preserving apparatus is as follows: The ice-compartment being filled with ice, and the lower chamber having the meat or other articles hung up therein, the doors are tightly closed. The warm and moist air from the meat, &c., quickly rises to the upper part of the chamber C under the floor D, and above the lower edge of the aprons H, and thence passes up the flue F at the end of the ice-chamber, and over and through the ice in the ice-chamber B. It then deposits its moisture and becomes very dry and cold, and consequently descends, not by the same passage, F, through which it rose, but at the passages *a*, on the sides of the ice-chamber, and enters the lower or preserving chamber, C, under the lower edge of the aprons H, but near the top of the preserving chamber. In the drawings the descending cold air is represented by the arrows in Fig. 1, and the ascending warmer air by the arrows in Fig. 2. When the air becomes throughly cooled in the lower chamber, C, this ascent and descent of air is very slow and gradual, being caused and kept up only by the gradual elevation of temperature of the air in the lower chamber, C, which is steadily reduced by the ice in the upper chamber.

It is manifest that various modifications of construction could be employed embodying the principles of my improvement.

What I claim as my invention, and desire to secure by Letters Patent, is—

1. The warm-air flue or passage F, leading from the top of the preserving-chamber C to the upper part of the ice chamber B, in combination with the separate cold-air flue or passage *a*, leading from the ice-chamber to a point in the preserving-chamber a little below the exit-level of the flue F, whereby a space is left for the warm air above the influence of the entering cold air, for the purposes hereinbefore described 2. The construction of a cooling and drying apparatus for preserving meat, vegetables, &c., whereby the cooler air, after passing over or through the ice in the upper ice-chamber, shall enter the lower or preserving chamber above the level at which the meat, &c., are to be placed, and a little below the opening for the ascent of the warmer air, and by a separate passage or passages from the warmer air, for the purposes hereinbefore described.

In witness whereof I, the said JOSEPH HYDE FISHER, have hereunto set my hand.

JOSEPH HYDE FISHER.

Witnesses:
JOHN GLENN,
R. C. WRENSHALL.